United States Patent [19]
Kishino

[11] Patent Number: 4,511,129
[45] Date of Patent: Apr. 16, 1985

[54] QUARTER-WINDOW STRUCTURE FOR VEHICLE

[75] Inventor: Kohji Kishino, Hiroshima, Japan

[73] Assignee: Toyo Kogyo Co., Ltd., Japan

[21] Appl. No.: 545,188

[22] Filed: Oct. 25, 1983

[30] Foreign Application Priority Data

Oct. 25, 1982 [JP] Japan .............................. 57-161997[U]
Dec. 1, 1982 [JP] Japan ................................ 57-210997

[51] Int. Cl.³ .............................................. B60J 1/08
[52] U.S. Cl. .................................... 296/146; 296/201; 49/398
[58] Field of Search .................. 296/146, 201; 49/398, 49/399; 16/225, DIG. 13, 226

[56] References Cited

U.S. PATENT DOCUMENTS 2,733,096  1/1956  Waterhouse et al. ............... 296/146
4,348,046  9/1982  Ohya .................................... 296/201

FOREIGN PATENT DOCUMENTS 51-31217  8/1976  Japan .
54-823    6/1979  Japan .
55-32203  8/1980  Japan .
56-31937  8/1981  Japan .

Primary Examiner—Robert R. Song
Attorney, Agent, or Firm—Gerald J. Ferguson, Jr.; Joseph J. Baker

[57] ABSTRACT

A quarter-window for a vehicle is hinged to the center pillar of the vehicle by way of a hinge. The center pillar is provided with a holder having a hinge receiving opening and welded to the center pillar. The hinge is inserted into the hinge receiving opening of the holder by moving the window-hinge assembly forwardly with respect to the vehicle body and the hinge is fixed to the center pillar by a bolt from outside the vehicle body at the portion projecting forwardly from the hinge receiving opening. Rearward movement of the window-hinge assembly is limited so that the hinge cannot be withdrawn from the holder even if the bolt is removed from the center pillar.

11 Claims, 6 Drawing Figures

QUARTER-WINDOW STRUCTURE FOR VEHICLE

BACKGROUND OF THE INVENTION

1. Field of the Invention

This invention relates to a quarter-window of a vehicle which is hinged to the center pillar to be swung open laterally about the hinge.

2. Description of the Prior Art

As is well known in the art, the quarter-window is generally mounted on the center pillar by way of a hinge. The hinge is generally fixed to the center pillar by a bolt which is screwed into the pillar from outside or inside of the vehicle body. From the viewpoint of workability, it is preferred that the bolt be screwed from outside while from the viewpoint of security against theft, it is preferred that the bolt be screwed from inside. Since when the hinge is mounted from outside, the quarter-window can be removed from outside by demounting the hinge from the center pillar. Further, it has been known to provide a pillar garnish on the center pillar to improve the external appearance.

There have been made various attempts to improve the workability in mounting the quarter-window without sacrificing security.

In one attempt the pillar garnish is utilized to improve the security. That is, the pillar garnish is placed over the mounting portion of the hinge of the quarter-window to prevent access thereto from outside the vehicle and is mounted on the center pillar so as not to be removable therefrom from outside the vehicle.

For example, the center pillar garnish to be placed over the mounting portion of the hinge is provided with stud bolts projecting from the inner surface thereof, and is fixed to the outer panel of the center pillar by nuts screwed on the stud bolts. With this arrangement the quarter-window can be prevented from being removed from outside even if the hinge is mounted on the center pillar from outside. In this respect, the arrangement is satisfactory. On the other hand, though the hinge may be mounted from outside, the work for mounting the garnish must be done from inside. Further, the inner panel of the center pillar must be provided with an opening for giving access to the stud bolt on the garnish which projects from the outer panel. This reduces the strength of the center pillar, and therefore the center pillar must be increased in size or must be provided with reinforcement. Further the opening must be covered with trim, thereby increasing the number of parts. Thus the conventional arrangement is not advantageous from the viewpoint of the overall workability and cost in mounting the quarter-window and the center pillar garnish.

In the structure disclosed in Japanese Unexamined Utility Model Publication No. 56(1981)-31937, the center pillar garnish is mounted on the center pillar from outside the vehicle body by means of screws, and the screws are covered. In the structure disclosed in Japanese Unexamined Utility Model Publication No. 55(1980)-32203, the center pillar garnish is mounted on the center pillar by clips fixed to the garnish by tapping screws. Though the inner panel of the center pillar need not be provided with access openings in the structures disclosed in these publications, the garnish can be easily removed from the center pillar from outside the vehicle body and accordingly cannot contribute to security. Further the number of parts is increased to add to the manufacturing cost.

Further, there has been known another structure in which the garnish is turned over the side of the center pillar and is fixed thereto by screws. This structure is disadvantageous from the viewpoint of the external appearance since the screws are visible when the door is open.

The present state of the art is disclosed in Japanese Unexamined Utility Model Publication Nos. 51(1976)-31217, 54(1979)-823, 55(1980)-32203 and 56(1981)-31937.

SUMMARY OF THE INVENTION

In view of the foregoing observations and description, the primary object of the present invention is to provide an improved structure of the quarter-window which permits both the hinge of the window and the center pillar garnish to be mounted from outside the vehicle body without sacrificing security, thereby improving the overall workability in mounting both the window and the garnish.

Another object of the present invention is to accomplish the above object without substantially increasing the manufacturing cost.

In accordance with the present invention, the quarter-window is mounted on the center pillar by way of a hinge which extends from the front end of the window substantially in parallel to the surface of the window. The hinge is adapted to be passed through a hinge receiving opening of a holder by being moved forward with respect to the vehicle body, the holder being welded to the center pillar, and the free end portion of the hinge projecting forward from the hinge receiving opening is fixed to the center pillar by means of a suitable fastener such as a bolt which can be manipulated from outside the vehicle body.

In the structure of the present invention, the quarter-window cannot be removed from the vehicle body even if the fastener is loosened from outside the vehicle body since the hinge is inserted into the hinge receiving opening of the holder and the hinge cannot be drawn out from the opening without rearward movement of the window which is limited by the window frame and the window opening-closing device on the rear end of the window. Thus in accordance with the present invention, security can be ensured without adversely affecting the workability in mounting the hinge of the quarter-window on the center pillar.

The quarter-window of the present invention may be provided with a center pillar garnish of any structure since the garnish need not contribute to security. That is, the garnish may be mounted on the center pillar in a manner which permits removal of the garnish from outside the vehicle body. In other words, the garnish may be mounted from outside in the known manner to ensure good workability. However, in a preferred embodiment of the present invention, an improved structure of the garnish is employed which permits the garnish to be mounted from outside to ensure good workability and at the same time prevents removal of the garnish from outside. In the preferred embodiment, a bolt for retaining a seat belt anchor is utilized to fix the garnish to the center pillar.

DESCRIPTION OF THE PREFERRED EMBODIMENT

Figure 1:
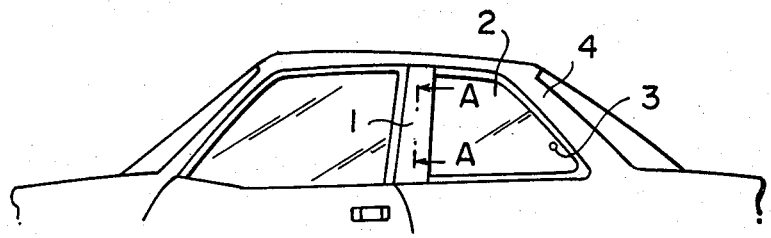
FIG. 1 is a fragmentary side view of a car employing a quarter-window in accordance with an embodiment of the present invention.
Figure 2:
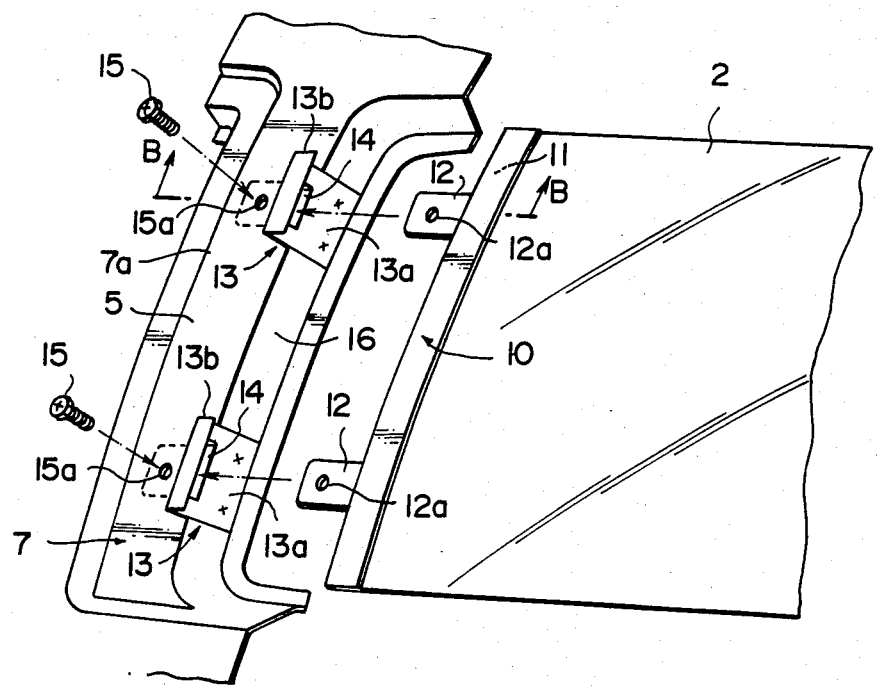
FIG. 2 is an exploded perspective view of the mounting portion of the quarter-window of FIG. 1 with the garnish removed.
Figure 3:
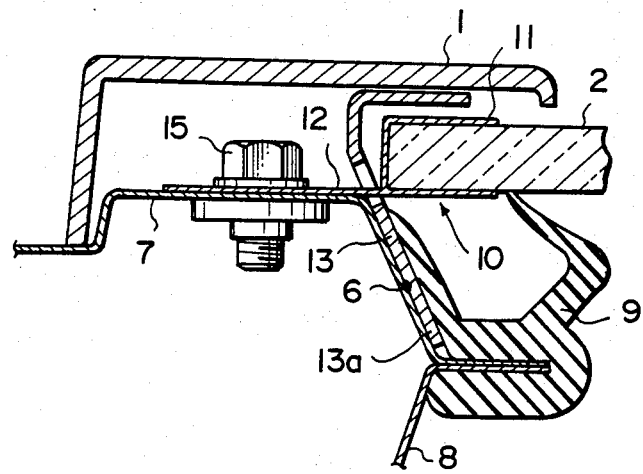
FIG. 3 is a cross-sectional view taken along line B—B in FIG. 2.

FIG. 1 is a fragmentary side view of a car provided with a quarter-window in accordance with an embodiment of the present invention. In FIG. 1, reference numerals 1 to 4 indicate a center pillar garnish covering the center pillar, a windowpane of the quarter-window, a window opening-closing device for the quarter-window and a window frame for the same, respectively. The quarter-window of this embodiment includes, as shown in FIGS. 2 and 3, the windowpane 2 and a hinge 10 for mounting the windowpane on the center pillar so that the quarter-window can be swung open. The hinge 10 is formed of flexible material and comprises a channel portion 11 into which the front end of the windowpane 2 is fixedly inserted, and a pair of retaining tongue portions 12 extending forwardly substantially in parallel to the surface of the windowpane 2. A pair of holders 13 are welded to the center pillar 5 on an inclining surface 6 connecting the outer panel 7 and the inner panel 8 of the center pillar 5. Each holder 13 comprises a base portion 13a along which the holder 13 is welded onto the inclining surface 6 of the center pillar 5 and a flange portion 13b turned rearwardly from the base portion 13a. Each holder 13 is further provided with a hinge receiving opening 14 the lower edge of which is substantially flush with the flat upper surface 7a of the outer panel 7. Said retaining tongue portions 12 of the hinge 10 are respectively passed through the hinge receiving openings 14 of the holders 13. A bolt hole 12a is formed in the free end portion of each tongue portion 12 projecting forwardly beyond the hinge receiving opening 14. The tongue portions 12 are inserted into the hinge receiving openings 14 of the holders 13 by moving the windowpane-hinge assembly forwardly and are fixed to the center pillar 5 by screwing a pair of bolts 15 into threaded holes 15a formed in the flat outer surface 7a of the outer panel 7 through the bolt holes 12a of the tongue portions 12.

Thus in the structure of this embodiment, the windowpane-hinge assembly cannot be removed from the vehicle body without being moved rearwardly by the distance required to withdraw the tongue portions 12 out of the hinge receiving openings 14 of the holders 13. Therefore, when the rearward movement of the windowpane 2 is limited by means of the window opening-closing device 3 and/or the window frame 4, for example, the windowpane-hinge assembly cannot be removed from the vehicle body from outside thereof even if the bolts 15 are removed from the center pillar 5 from outside the vehicle body.

The holders 13 also serves to temporarily hold the windowpane-hinge assembly during assembly of the quarter-window, thereby improving workability in mounting the windowpane-hinge assembly. Reference numeral 9 in FIG. 3 indicates a weather strip.

As can be seen from the description above, the garnish 1 covering the center pillar 5 and the mounting portion of the windowpane-hinge assembly need not contribute to protection against theft. That is, no provision against removal of the garnish 1 from outside the vehicle body is needed. However, it is preferred that the garnish 1 be mounted on the center pillar 5 so as not to permit its removal from outside the vehicle body so that the garnish itself can be prevented from being stolen. Further it is preferred that the garnish 1 be mountable from outside the vehicle body.

Now a pair of preferred structures for mounting the garnish 1 which permit the garnish 1 to be mounted from outside and at the same time does not permit removal of the garnish from outside the vehicle body will be described hereinbelow referring to FIGS. 4 to 6.

Figure 4:
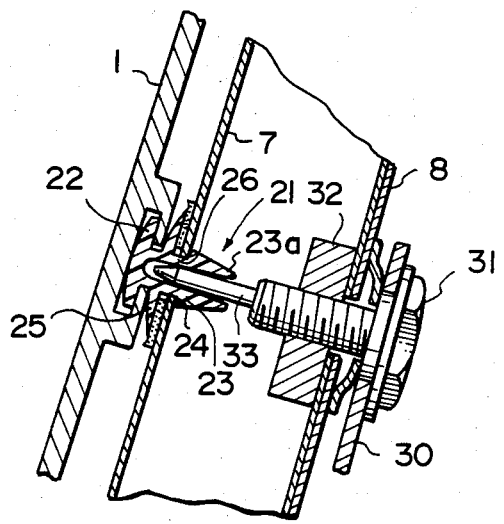
FIG. 4 is a cross-sectional view taken along line A—A in FIG. 1 showing a structure for mounting the garnish on the center pillar.
Figure 5:
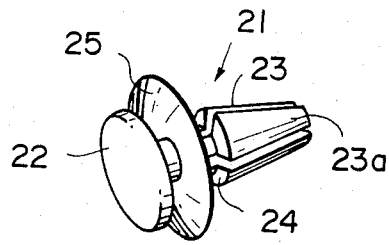
FIG. 5 is a perspective view of the fastener employed in the structure of FIG. 4.

FIG. 4 is a cross-sectional view taken along line A—A in FIG. 1 illustrating a preferred structure for mounting the garnish 1 on the center pillar 5. In FIG. 4, the garnish 1 is fixed to the outer panel 7 of the center pillar 5 by means of a plurality of fasteners 21. Each fastener 21 comprises a head portion 22 embedded in the inner surface of the garnish 1 and a hollow leg portion 23 having a tapered end portion 23a, an annular engaging shoulder 24 formed adjacent to the base portion of the tapered end portion 23a and an annular abutment portion 25 between the shoulder 24 and the head portion 22 as shown in FIG. 5. The tapered end portion 23a is trifurcated to be resiliently collapsed and when the tapered end portion 23a is forced into an opening 26 formed in the outer panel 7 of the center pillar 5. The tapered end portion 23a is once collapsed and then expands after the base portion thereof passes through the opening 26, whereby the engaging shoulder 24 engages with the peripheral edge of the opening 26 to prevent withdrawal of the fastener 21 from the outer panel 7. The abutment portion 25 is resiliently pressed against the outer surface of the outer panel 7 to keep the engaging shoulder 24 in close contact with the peripheral edge of the opening 26.

A seat belt anchor 30 is fixed on the inner surface of the inner panel 8 of the center pillar 5 by means of a bolt 31 which is screwed into a nut 32 welded onto the outer surface of the inner panel 8. One of the fasteners 21 is opposed to the nut 32 and a rod-like extension 33 provided on the bolt 31 is inserted into the leg portion 23 of the fastener 21 to positively expand the tapered end portion 23a and to prevent collapse of the same, thereby positively preventing withdrawal of the fastener 21 from the outer panel 7. Thus the structure shown in FIG. 4 permits mounting of the garnish 1 from outside and at the same time prevents removal of the same from outside the vehicle body. The fastener may be formed integrally with the garnish 1.

Figure 6:
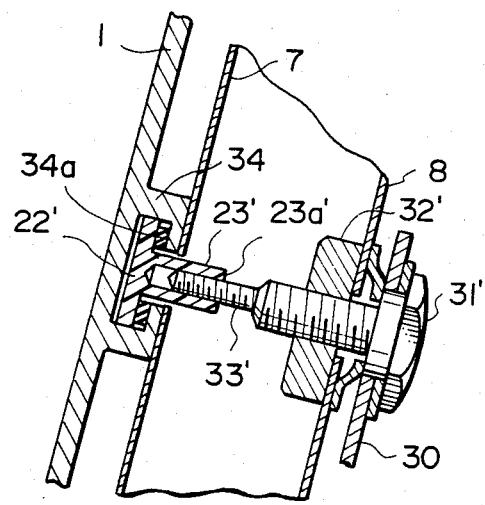
FIG. 6 is a view similar to FIG. 4 showing a modification of the structure of FIG. 4.

In the modification shown in FIG. 6, the leg portion 23' is in the form of a straight cylindrical portion having a threaded hole 23a' and the bolt 31' has a threaded extension 33'. The threaded extension 33' is screwed into the threaded hole 23a' of the leg portion 23' when the bolt 31' is screwed into the nut 32' to secure the seat belt anchor 30, thereby preventing removal of the garnish 1 from outside the vehicle body. The head portion 22' is inserted in the retaining portion 34 formed in the inner surface of the garnish 1. A cushion member 34a is interposed between the head portion 22' and the wall of the retaining portion to prevent the head portion 22' from being subjected to an excessive force when the threaded extension 33' is screwed into the threaded hole 23a'.

Said flange portion 13b of the holder 13 provides a flat surface which abuts against the inner surface of the garnish 1 to define the mounting position of the garnish 1.

Though in the above embodiment, the hinge 10 is formed of a flexible material, a rigid hinge loosely fixed to the center pillar to permit swinging movement of the window may be used.

I claim:

1. A quarter-window structure for a vehicle comprising a windowpane fitted on a side window frame, an opening-closing device which is connected between the rear end portion of the windowpane and the side window frame, a hinge which is fixed to the front end portion of the windowpane and extends substantially in parallel to the surface of the windowpane, a holder which is fixed to a center pillar of the vehicle and is provided with a hinge receiving opening, the hinge being adapted to be passed through the hinge receiving opening of the holder by being moved forwardly with respect to the vehicle body, a fastener for fixing the free end portion of the hinge projecting forwardly from the hinge receiving opening of the holder to the center pillar from outside the vehicle body, and a garnish which covers the free end portion of the hinge and the holder.

2. A quarter-window structure as defined in claim 1 in which said center pillar of the vehicle comprises an outer panel having a flat outer surface, an inner panel and an inclined surface extending between the outer panel and the inner panel, said free end portion of the hinge being fixed to the flat outer surface of the outer panel, and said holder being fixed to the inclined surface.

3. A quarter-window structure as defined in claim 2 in which said hinge comprises a channel portion into which the front end portion of the windowpane is fixedly inserted and a plurality of vertically spaced retaining portions which form said free end portion, and a like number of said holders are fixed to said center pillar, each for receiving one of the retaining portions, each retaining portion being fixed to the center pillar by means of a threaded member.

4. A quarter-window structure as defined in claim 3 in which each of said holders comprises a base portion at which the holder is fixed to the center pillar and a flange portion turned from the base portion to provide a flat surface for defining the mounting position of the garnish, and said hinge is formed of a flexible material.

5. A quarter-window structure as defined in claim 1 in which said holder comprises a base portion at which the holder is fixed to the center pillar and a flange portion turned from the base portion to provide a flat surface for defining the mounting position of the garnish.

6. A quarter-window structure as defined in claim 1 in which said hinge comprises a channel portion into which the front end portion of the windowpane is fixedly inserted and a retaining portion which forms said free end portion and is fixed to the center pillar, and said fastener is a threaded member.

7. A quarter-window structure as defined in claim 6 in which said hinge is formed of a flexible material.

8. A quarter-window structure as defined in claim 1 in which said center pillar comprises an outer panel and an inner panel, and said garnish is provided with retainer means which is adapted to be associated with a bolt member for fixing an seat belt anchor to the inner side of the inner panel to positively retain the garnish on the outer panel.

9. A quarter-window structure as defined in claim 8 in which said outer panel of the center pillar is provided with a garnish mounting hole opposed to the bolt member, said retainer means is in the form of a garnish mounting member comprising a head portion fixed to the garnish and a leg portion inserted into the garnish mounting hole, and said bolt member is provided with an extension projecting toward the garnish mounting hole, the leg portion being adapted to be associated with the extension to positively retain the garnish on the outer panel.

10. A quarter-window structure as defined in claim 9 in which said leg portion has a collapsible hollow portion and an engaging shoulder and is adapted to be forced into the garnish mounting hole with the collapsible hollow portion being collapsed when passing through the garnish mounting opening and resiliently expanding thereafter to bring the engaging shoulder into engagement with the inner surface of the outer panel around the opening, and said extension of the bolt member has a tapered end portion which is inserted into the collapsible hollow portion to keep it in the expanded state.

11. A quarter-window structure as defined in claim 9 in which said leg portion has an internally threaded hollow portion and said extension of the bolt member is threaded to be screwed into the hollow portion.

* * * * *